US010705247B2

(12) United States Patent
Arrambide et al.

(10) Patent No.: US 10,705,247 B2
(45) Date of Patent: *Jul. 7, 2020

(54) METHODS AND MEANS FOR FRACTURE MAPPING IN A WELL BORE

(71) Applicant: VISURAY INTECH LTD (BVI), Tortola (VG)

(72) Inventors: Mauro Arrambide, Montgomery, TX (US); Melissa Spannuth, Houston, TX (US); Philip Teague, Houston, TX (US)

(73) Assignee: Visuray Intech Ltd (BVI), Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 16/193,949

(22) Filed: Nov. 16, 2018

(65) Prior Publication Data
US 2019/0101666 A1    Apr. 4, 2019

Related U.S. Application Data

(60) Provisional application No. 62/589,746, filed on Nov. 22, 2017.

(51) Int. Cl.
*G01V 5/00* (2006.01)
*G01V 5/12* (2006.01)
(Continued)

(52) U.S. Cl.
CPC ............ *G01V 5/12* (2013.01); *E21B 47/1015* (2013.01); *G01N 23/203* (2013.01);
(Continued)

(58) Field of Classification Search
CPC . G01V 5/12; G01V 5/125; G01V 5/08; G01V 5/04; G01N 23/204; G01N 23/203; E21B 47/1015
See application file for complete search history.

(56) References Cited

U.S. PATENT DOCUMENTS

| 4,825,073 A | 4/1989 | Smith, Jr. et al. |
| 2005/0078799 A1* | 4/2005 | Ancelin .................. A61B 6/502 378/154 |

(Continued)

FOREIGN PATENT DOCUMENTS

WO    WO-2016078727 A1 *  5/2016  ............... G01V 5/12

OTHER PUBLICATIONS

Notification of Transmittal of the International Search Report and the Written Opinion of the International Searching Authority, or the Declaration issued in the corresponding PCT International Application No. PCT/US2018/061617, dated Feb. 18, 2019 (15 pages).

(Continued)

*Primary Examiner* — Kiho Kim
(74) *Attorney, Agent, or Firm* — Raymond R. Ferrera; Adams and Reese LLP

(57) ABSTRACT

A borehole fracture evaluation tool for imaging radiation emitted by radioactive materials injected into the formation during hydraulic fracturing operations, the tool including at least one collimated imaging detector used to record x-ray backscatter images; sonde-dependent electronics; and a plurality of tool logic electronics and power supply units. A method for fracture evaluation imaging, the method including at least injecting radioactive tracer materials into the formation fractures; controlling the imaging direction of an imaging array detector; imaging the fracture structures; creating a composite image of the fractures versus the formation; and determining the size and position of the fractures.

10 Claims, 2 Drawing Sheets

(51) Int. Cl.
- *G01N 23/203* (2006.01)
- *G01V 5/08* (2006.01)
- *G01N 23/204* (2006.01)
- *E21B 47/10* (2012.01)
- *G01V 5/04* (2006.01)

(52) U.S. Cl.
CPC ............ *G01N 23/204* (2013.01); *G01V 5/04* (2013.01); *G01V 5/08* (2013.01); *G01V 5/125* (2013.01)

(56) References Cited

U.S. PATENT DOCUMENTS

| | | | |
|---|---|---|---|
| 2009/0086902 A1* | 4/2009 | Boyden | A61B 5/415 378/45 |
| 2009/0086905 A1* | 4/2009 | Boyden | G01N 23/223 378/46 |
| 2011/0019801 A1* | 1/2011 | Eichenseer | G01T 1/2985 378/147 |
| 2014/0182844 A1* | 7/2014 | Wutherich | E21B 43/26 166/250.02 |
| 2015/0177409 A1* | 6/2015 | Sofiienko | G01V 5/125 250/269.1 |
| 2016/0187527 A1* | 6/2016 | Berheide | G01V 5/14 250/267 |
| 2017/0038316 A1* | 2/2017 | Belcher | B61K 9/10 |
| 2017/0218749 A1 | 8/2017 | Lee et al. | |
| 2018/0064407 A1* | 3/2018 | Beacham | G01T 1/2002 |

OTHER PUBLICATIONS

Philip Neil Teague, Imaging of Backscattered Ionizing Radiation—A Key Enabler for Through Mud Borehole Imaging, Offshore Technology Conference, OTC 21667, Presentation in Houston, Texas on May 2-5, 2011, (16 pages).

F.K. Thurston et al, Enhancing Frac-Pack Evaluations with Directional and Spectral Gamma Ray Measurements, SPE Annual Technical Conference and Exhibition Held in San Antonio, Oct. 8, 1997, (13 pages).

G.A. Simpson et al, Interpretation of Directional Gamma Ray Logging Data for Hydraulic Fracture Orientation, Low Permeability Reservoirs Symposium, Apr. 28, 1993 (12 pages).

* cited by examiner

METHODS AND MEANS FOR FRACTURE MAPPING IN A WELL BORE

TECHNICAL FIELD

The present invention relates generally to measurement and determination of directional and depth information when mapping fractures within wellbore environments. Also disclosed are methods and means for acquiring directional and depth information about fractures within a formation outside of a cased wellbore by employing a plurality of collimated gamma-ray detectors in order to detect radiation emitted by radioactive materials injected into the formation during hydraulic fracturing operations and creating a three-dimensional map of the fractures.

BACKGROUND

Within the oil & gas industry, well operators need to quantify the efficacy of hydraulic fracturing treatments performed on their wells in order to optimize production. The current standard practice is to inject radioactive tracer materials into the fractures and run a standard gamma ray log. Gamma ray logs are known in the art for measuring the background level of radioactive materials in a formation during the exploration or drilling phase of a well in order to aid in identification of the formation rock type and estimate hydrocarbon reserves. When used during hydraulic fracturing evaluation, the gamma ray logging tool registers elevated gamma ray levels at the depths of fractures into which the radioactive tracer material was injected. This can tell an operator where open fractures are located axially along the well bore but cannot give any information about where open fractures are located azimuthally around the well bore or the depth of the fractures.

No viable technologies are currently available that use a method or means to employ at least one collimated detector located within a borehole logging tool to produce three-dimensional images and maps of the location and depth of formation fractures filled with radioactive material within a cased borehole.

Prior art teaches a variety of techniques that use gamma ray logging techniques to locate the fractures and estimate the fracture depth, but none can produce a three-dimensional image of the fractures.

US20180188411 to Teague et al. teaches methods and means for improving the resolution and determination of the density of the materials surrounding a wellbore, in a package requiring no direct physical contact with the well casings (i.e., non-padded). The method and means described herein comprise using an actuated combination of collimators located cylindrically around an x-ray source, the actuated combination of collimators being located within a non-padded concentrically-located borehole logging tool, for detecting density variations within the annular materials surrounding a borehole within single or multi-string cased-hole environments. The actuation of collimators permits the operator to choose between a fixed collimator mode in which the output is an azimuthal array of a plurality of x-ray beams, and an actuated collimator mode in which a single or plurality of individual azimuthally-arranged x-ray beams scan azimuthally through the rotation of one of the collimators. In addition, the actuation permits the operator to select a further non-rotating-mode in which the collimator sleeve switches among various angles or declinations of x-ray beam outputs with respect to the major axis of the tool.

U.S. Pat. No. 7,705,294 to Teague teaches an apparatus that measures backscattered x-rays from the inner layers of a borehole in selected radial directions with the missing segment data being populated through movement of the apparatus through the borehole. The apparatus permits generation of data for a two-dimensional reconstruction of the well or borehole.

U.S. Pat. No. 9,817,152 to Sofiienko et al. teaches a method and means of creating a three-dimensional map of cement, casings and formation surrounding a cased borehole, using x-ray radiation to illuminate the casings, annular materials and formation. Further, it teaches a means that produces a voxelated map that contains axial, radial and azimuthal density variations, and thereby the geometry and form of the cement surrounding the cased hole.

U.S. Pat. No. 4,439,677 to Martin discloses a method for determining the vertical extent of a fracture in a wellbore injecting radioactive tracers along with a filter cake material into a well. When the filter cake forms at the entrance to each fracture, the radioactive material will be stuck in the filter cake and a nuclear log survey can detect that radioactive material to determine the height of the fracture.

U.S. Pat. No. 4,415,805 to Fertl et al. discloses a method for evaluating a multistage fracturing operation by injecting a different radioactive tracer with each stage of the fracture operation. By separating the gamma ray log signals according to the characteristic energies of each different tracer, the efficacy of each stage can be assessed separately.

U.S. Pat. No. 4,464,569 to Flaum discloses a method for determining the elemental composition of earth formations surrounding a well borehole by processing detected neutron capture gamma radiation emanating from the earth formation after neutron irradiation of the earth formation by a neutron spectroscopy logging tool.

U.S. Pat. No. 4,433,240 to Seeman discloses a borehole logging tool that detects natural radiation from the rock of the formation and logs said information so that it may be represented in an intensity versus depth plot format.

U.S. Pat. No. 4,825,073 to Smith et al. discloses a method for determining the depth of penetration of a formation fracture by injecting radioactive material into the fracture and then detecting the emitted radiation in two energy ranges. The ratio of the intensity of detected radiation in a higher energy range where the radiation has not undergone Compton scattering to that in a lower energy range where the radiation has undergone Compton scattering indicates the depth into the formation at which the radiation originated and can be used to estimate the depth of the fracture.

U.S. Pat. No. 4,857,729 to Gadeken et al. discloses a method for radioactive well logging in which radioactive isotopes are used to tag the hydraulic fracturing material. A low energy radioisotope is chosen for the fluid and a high energy radioisotope is chosen for the solid within the hydraulic fracturing mixture. The radiation detected from the two separate isotopes can be used to correct for the effects of radioactive material within the wellbore.

U.S. Pat. No. 4,926,940 to Stromswold discloses a method mapping fractures involving injecting a neutron-activated radioactive material into the fractures. Logging the well before and after fracturing gives a measure of the extent of the fractures.

U.S. Pat. No. 5,322,126 to Scott discloses a method of actively monitoring fracture growth during a hydraulic fracturing operation by injecting neutron-activated radioactive material with the fracturing fluid, activating the material by passing next to a neutron source as the fluid travels into the well, and sensing the emitted radiation from the activated material in the fracture using multiple sodium-iodide scintillometer detectors.

U.S. Pat. No. 5,410,152 to Gadeken discloses a method of obtaining fracture penetration depth by measuring the radiation emitted by radioactive tracers injected into fractures across multiple energy bins. Then, the signals from different energy bins are correlated with the depth into the formation from which each signal arose.

U.S. Pat. No. 5,441,110 to Scott discloses a method of actively monitoring fracture growth during a hydraulic fracturing operation by injecting gamma-emitting tracer material into the fracture fluid using downhole-placed exploding charges, and sensing the emitted radiation from the material in the fracture using multiple sodium-iodide scintillometer detectors.

U.S. Pat. No. 5,442,173 to Wraight discloses a method of monitoring formation fracturing in real-time by means of injecting fracture fluid containing radioactive isotopes and placing detectors at pre-determined positions in the wellbore. An increase in the signal received by these detectors means that the fracture fluid is approaching the height or vertical depth of the detectors. Once the desired level is reached pumping of fracture fluid can be stopped.

U.S. Pat. No. 5,635,712 to Scott discloses a method of actively monitoring fracture growth during a hydraulic fracturing operation by injecting gamma-emitting tracer material into the fracture fluid using a downhole injector, and sensing the emitted radiation from the material in the fracture using multiple sodium-iodide scintillometer detectors.

U.S. Pat. No. 7,726,397 to McDaniel et al. discloses a method of placing a fracturing fluid or proppant containing vanadium and/or indium into a fracture, activating it with neutrons, measuring the gamma-radiation emitted from the material in a single pass and determining formation fracture height from this single pass.

U.S. Pat. Nos. 7,933,718 and 8,392,120 to McDaniel et al. disclose a method and tool for determining fracture geometry based on in-situ neutron activation analysis. The method involves measuring gamma-radiation emitted from the fracture; subtracting background radiation from the measured gamma-radiation to obtain a peak-energy measurement; comparing the peak-energy measurement with a gamma-ray transport/spectrometer response model; and determining formation fracture geometry of the fracture.

U.S. Pat. Nos. 8,129,318 and 9,243,491 to McDaniel et al. disclose a method of placing a fracturing fluid or proppant containing vanadium and/or indium into a fracture, activating it with neutrons, measuring the gamma-radiation emitted from the material in a single pass and determining formation fracture height from this single pass.

U.S. Pat. No. 9,012,836 to Wilson et al. discloses a method and means for creating azimuthal neutron porosity images in a wireline environment. Similar to U.S. Pat. No. 8,664,587, this reference discusses an arrangement of azimuthally static detectors that could be implemented in a wireline tool to assist an operator in interpreting logs post-fracking by subdividing the neutron detectors into a plurality of azimuthally arranged detectors shielded within a moderator so as to infer directionality to incident neutrons and gamma.

U.S. Pat. No. 4,883,956 to Manente et al. discloses an apparatus and method for investigating subsurface earth formations, using an apparatus adapted for movement through a borehole. Depending upon the formation characteristic or characteristics to be measured, the apparatus may include a natural or artificial radiation source for irradiating the formations with penetrating radiation such as gamma rays, x-rays or neutrons. The light produced by a scintillator in response to detected radiation is used to generate a signal representative of at least one characteristic of the radiation and this signal is recorded.

U.S. Pat. No. 6,078,867 to Plumb discloses a method for generating a three-dimensional graphical representation of a borehole, comprising the steps of: receiving caliper data relating to the borehole, generating a three-dimensional wire mesh model of the borehole from the caliper data, and color mapping the three-dimensional wire mesh model from the caliper data based on either borehole form, rugosity and/or lithology.

SUMMARY

A borehole fracture evaluation tool for imaging radiation emitted by radioactive materials injected into the formation during hydraulic fracturing operations is provided, wherein the tool includes at least one collimated imaging detector used to record x-ray backscatter images; sonde-dependent electronics; and a plurality of tool logic electronics and power supply units.

A method for fracture evaluation imaging is also provided, wherein the method includes at least: injecting radioactive tracer materials into the formation fractures; controlling the imaging direction of an imaging array detector; imaging the fracture structures; creating a composite image of the fractures versus the formation; and determining the size and position of the fractures.

BRIEF DESCRIPTION OF SEVERAL EXAMPLE EMBODIMENTS

The invention disclosed herein consists of methods and means of employing a plurality of collimated gamma-ray detectors in order to detect radiation emitted by radioactive materials injected into the formation during hydraulic fracturing operations and create a three-dimensional map of the fractures.

Figure 1:
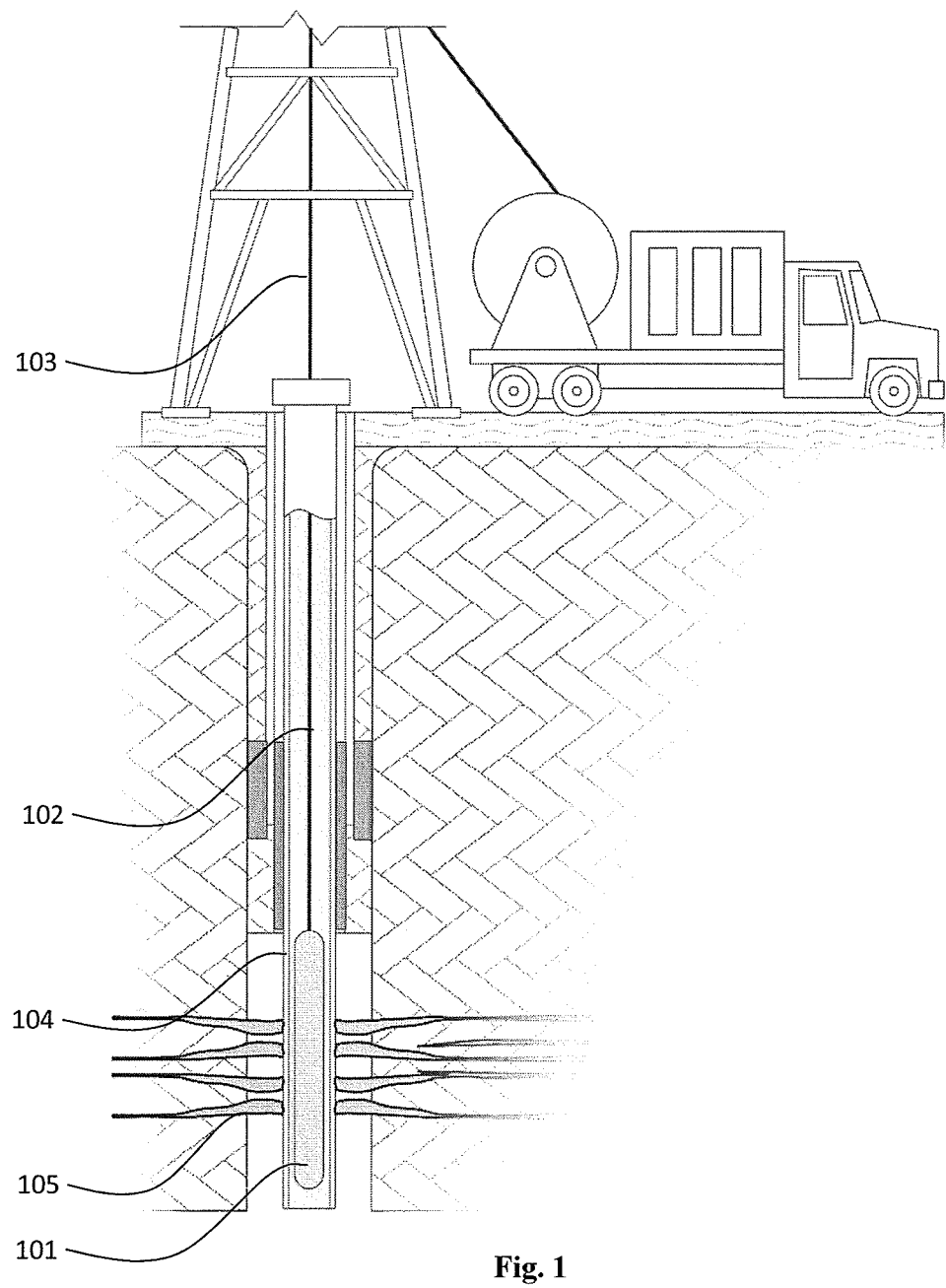
FIG. 1 illustrates a fracture imaging tool being lowered into a well by means of wireline conveyance, in addition to the fractures surrounding the cased wellbore.

In one example embodiment, and with reference now to FIG. 1, a fracture imaging tool [101] is deployed by wireline conveyance [102, 103] into a cased borehole [104], wherein the fractures [105] are imaged.

Figure 2:
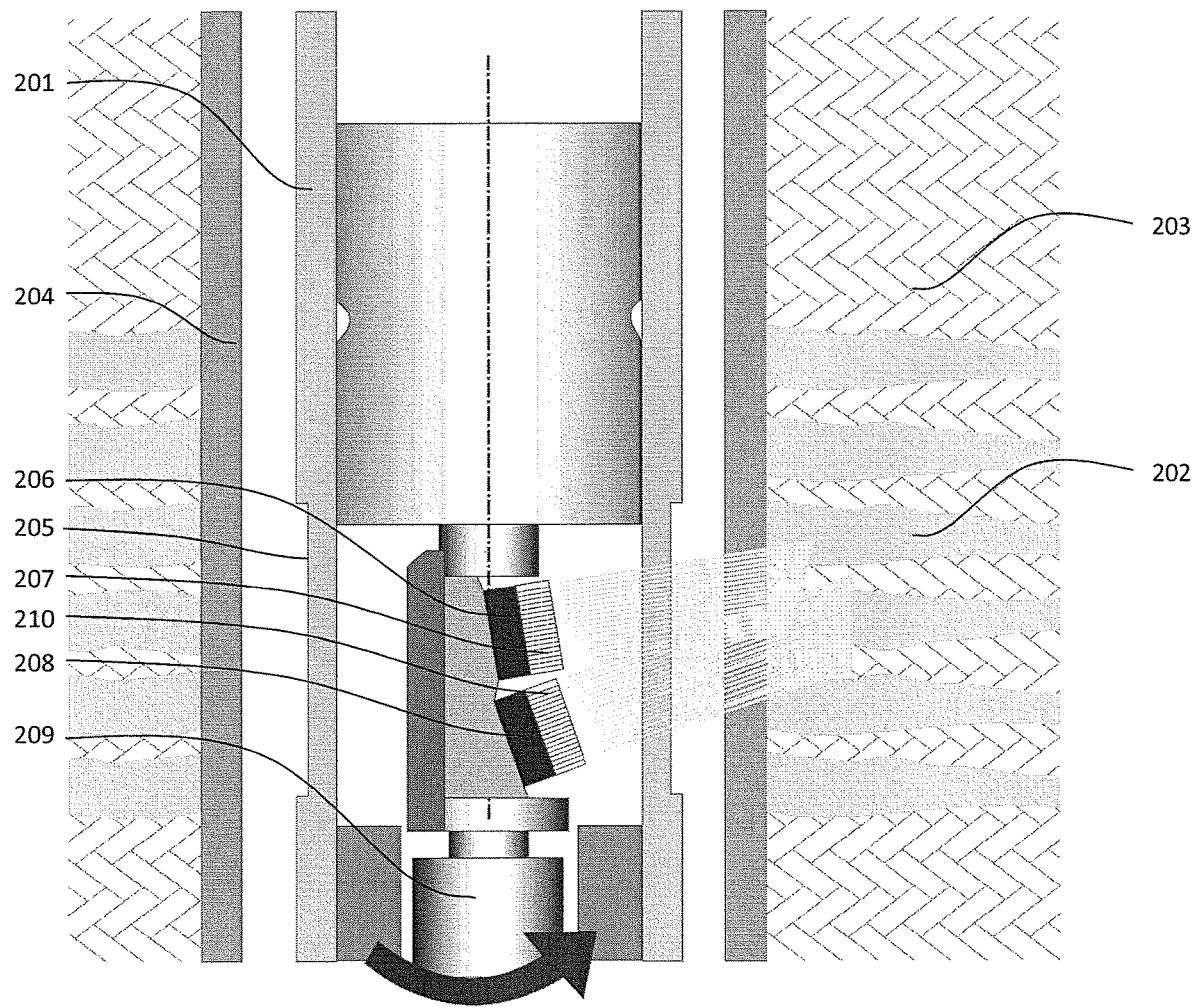
FIG. 2 illustrates one example of one embodiment of a fracture imaging tool employing collimated pixel array detectors to determine the size and position of fractures in the formation surrounding the wellbore.

With reference now to the attached Figures, FIG. 2 illustrates how formation outside the cased/lined [204] borehole has previously undergone hydraulic fracturing using any of the standard techniques known in the art with the requirement that the fracturing fluids contained a radioactive tracer [202] of any of the varieties known in the art. The pressure housing [201] contains at least one two-dimensional detector array [206, 208], which is attached to a per-pixel array collimator [207, 210]. A section of the pressure housing may be thinned [205] to decrease the attenuation of incoming photons by the pressure housing, or a low-attenuation structural material may be chosen.

The detector collimator [207, 210] reduces the field of view of each pixel of the detector array [206, 208] such that each pixel images a distinct and unique depth into the formation [203]. A motor/servo [209] is used to rotate the detector azimuthally, such that the collimated detector array images the formation around the full 360° azimuth of the well bore. While the motor/servo [209] rotates the collimated detector array [206, 208], images of the radiation emitted by the formation are acquired.

As the tool is being conveyed through the wellbore, the result would be a helical ribbon of stacked images. The radiation imaged by the detector array arises from naturally-occurring radioactive materials (the "NORM") in the formation in addition to the radioactive tracer materials injected into the fractures during the hydraulic fracturing operations. The NORM contributes a low-level background signal, while the radioactive tracer signal will be much stronger due to the higher activity and concentration of radioactive tracer material. In this way, three-dimensional images of the fractures are created, thereby providing directional and depth mapping.

In another embodiment, as the detector assembly rotates azimuthally, each axial column of pixels of the detector array would be sampled such that each column would image a similar section of the formation that had been imaged by its neighbor during the last sample. Upon encoding the images with the known azimuthal capture position of the image section, the separate image pixel columns associated with each imaged slit section of the formation could be summated/averaged to produce a higher quality image within a single pass.

In a further embodiment, two detectors are used, each axially offset from the other and oriented such that the field of view of each of the corresponding collimator sets images a different depth of investigation into the formation, such that radial imaging of the fractures is achieved.

In a further embodiment, two detectors are used back-to-back facing outwards, or side-by-side facing opposite directions, such that when the detector assembly is rotated, a double-helical image ribbon is produced as the tool is conveyed through the wellbore.

In a further embodiment, an 'n' number detectors are used facing outwards, or arranged for maximal volumetric packing efficiency, such that when the detector assembly is rotated, an n-helical image ribbon is produced as the tool is conveyed through the wellbore.

In a further embodiment, detectors are used facing outwards and stacked in axially along the tool, such that the detectors' fields-of-view when combined cover a full 360° azimuthally around the well bore.

In one embodiment, the logging speed and detector assembly rotational rate are matched such, that a single azimuthal rotation of the detector assembly is performed while the tool is conveyed axially by one imaged axial formation section [8] height, such that the resulting image of the formation is complete and helically welded.

In one embodiment, the detector assembly rotation and axial/radial tilt may be controlled through the use of servos/actuators such that the operator may stop the tool within the borehole and inspect certain sections of the formation (i.e., without the detector assembly being in continual rotation mode).

In one embodiment, the operator may stop the conveyance of the tool and use the azimuthal rotation of the detector assembly to continually sample the same formation [8] section, such that the resulting data set can build/summate statistically to improve image quality.

In one embodiment, the images may also contain spectral information, such that a photo-electric or characteristic-energy measurement may be taken, such that the imaged material is analyzed for composition.

In a further embodiment, machine learning is employed to automatically analyze the spectral (photo electric or characteristic energy) content of the images to identify the material composition.

In a further embodiment, the per-pixel collimated imaging detector array would be a single 'strip' array, i.e., one pixel wide azimuthally, and multiple pixels long axially; the imaging result would be a 'cylindrical' ribbon image. In such manner, the tool can be moved axially (either by wireline-winch or with a stroker) and a new image set taken, so that a section of formation is imaged by stacking cylindrical ribbon images/logs.

In a further embodiment, machine learning is employed to automatically reformat (or re-tesselate) the resulting images, as a function of depth and varying logging speeds or logging steps, such that the finalized casing and/or cement image is accurately correlated for azimuthal direction and axial depth, by comparing with CCL, wireline run-in measurements, and/or other pressure/depth data.

In a further embodiment, background gamma ray logs acquired by gamma ray logging techniques known-in the art are used to correct the images for the NORM background signal to improve fracture image quality.

The foregoing specification is provided only for illustrative purposes, and is not intended to describe all possible aspects of the present invention. While the invention has herein been shown and described in detail with respect to several exemplary embodiments, those of ordinary skill in the art will appreciate that minor changes to the description, and various other modifications, omissions and additions may also be made without departing from the spirit or scope thereof.

The invention claimed is:

1. A borehole fracture mapping tool that images radiation emitted by radioactive materials injected into the formation during hydraulic fracturing operations, wherein said tool comprises:
    at least one collimated imaging detector to record images radiation emitted by radioactive materials injected into the formation during hydraulic fracturing operations;
    sonde-dependent electronics,
    and a plurality of tool logic electronics and power supply units.

2. The tool of claim 1, wherein said collimated imaging detector comprises a two-dimensional per-pixel collimated imaging detector array wherein the imaging array is multiple pixels wide and multiple pixels long.

3. The tool of claim 1, wherein said collimated imaging detector comprises a plurality of two-dimensional per-pixel collimated imaging detector arrays wherein the imaging arrays are multiple pixels wide and multiple pixels long.

4. Tool of claim 1, wherein said collimated imaging detector comprises a two-dimensional per-pixel collimated imaging detector array wherein the imaging array is multiple pixels wide and a single pixel long.

5. The tool of claim 1, wherein said collimated imaging detector comprises a plurality of two-dimensional per-pixel collimated imaging detector arrays wherein the imaging arrays are multiple pixels wide and a single pixel long.

6. The tool of claim 1, wherein said collimated imaging detector collects energy information about the detected photons.

7. The tool of claim 1, wherein said collimated image energy information is processed by use of machine learning to analyze the spectral content to determine the material composition.

8. The tool of claim 1, wherein background gamma rays are used to correct the images for the background signal to improve fracture image quality.

9. The tool of claim 1, wherein said tool is configured so as to permit through-wiring.

10. The tool of claim 1, wherein said tool is combinable with other measurement tools comprising one or more of acoustic, ultrasonic, neutron, electromagnetic and/or other x-ray-based tools.

* * * * *